E. BUNZEL.
DEMOUNTABLE RIM.
APPLICATION FILED SEPT. 9, 1919.
1,431,150.
Patented Oct. 10, 1922.
2 SHEETS—SHEET 1.
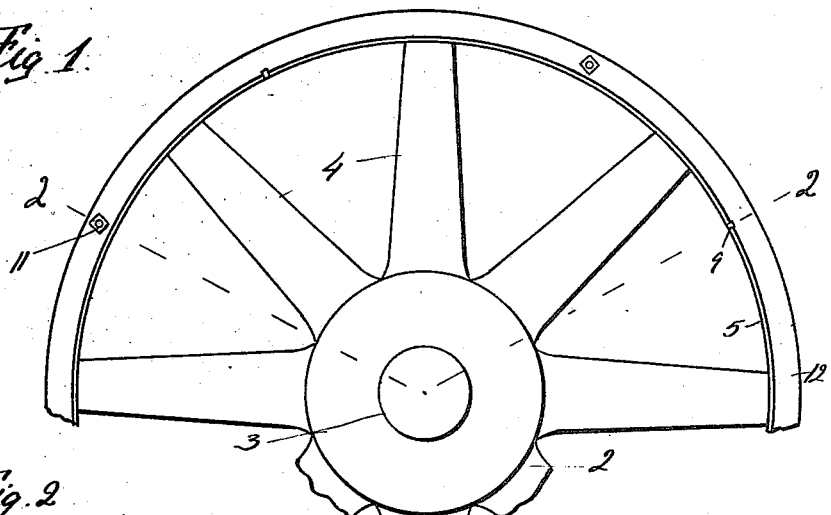
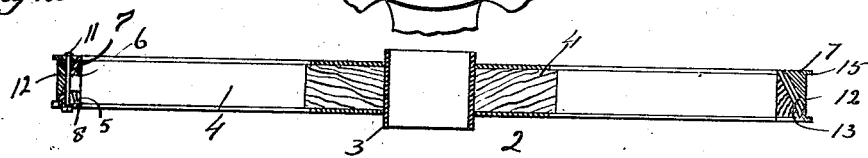
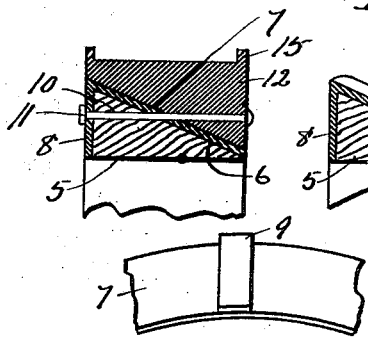
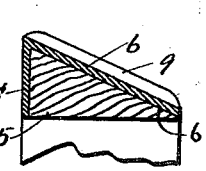
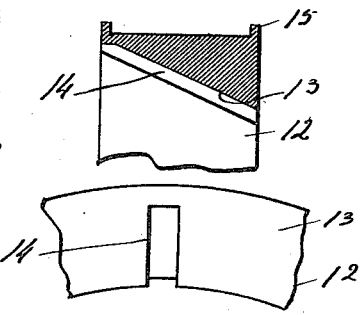
Inventor
Ernest Bunzel
By W. W. Williamson
Atty.

E. BUNZEL.
DEMOUNTABLE RIM.
APPLICATION FILED SEPT. 9, 1919.

1,431,150.

Patented Oct. 10, 1922.
2 SHEETS—SHEET 2.

Inventor
Ernest Bunzel
By W. W. Williamson
Atty.

Patented Oct. 10, 1922.

1,431,150

UNITED STATES PATENT OFFICE.

ERNEST BUNZEL, OF PLYMOUTH MEETING, PENNSYLVANIA.

DEMOUNTABLE RIM.

Application filed September 9, 1919. Serial No. 322,687.

*To all whom it may concern:*

Be it known that I, ERNEST BUNZEL, a citizen of the United States, residing at Plymouth Meeting, in the county of Montgomery and State of Pennsylvania, have invented new and useful Improvements in Demountable Rims, of which the following is a specification.

My invention relates to a new and useful improvement in demountable rims, adapted for use upon automobile wheels and more particularly with automobile truck wheels, and has for its object to provide a rim for carrying a tire either solid or pneumatic, said rim being capable of being readily and easily removed or replaced.

A further object of the invention is to provide a wheel felly with permanent keys located at different points about its periphery with which register keyways or slots formed in the demountable rim.

A further object of the invention is to provide a wheel felly with a beveled peripheral face to coact with a similarly beveled inner face of the demountable rim causing the demountable rim to be positioned laterally without the use of stops in the form of flanges or lugs.

A still further object of the invention is to provide a ring or armor of unique construction the same preferably being of metal and carrying the permanent keys for registration with the keyways in the demountable rim when the latter is placed upon the wheel, said keys preventing circumferential displacement of the demountable rim.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Fig. 1, is a fragmentary side elevation of a wheel constructed in accordance with my invention.

Fig. 2, is a section at the line 2—2 of Fig. 1.

Fig. 3, is an enlarged sectional view through the wheel felly and demountable rim at one point.

Fig. 4, is a similar view of the wheel felly with the demountable rim removed.

Fig. 5, is an enlarged side elevation of the wheel felly in the locality of one of the keys with the demountable rim removed.

Fig. 6, is an enlarged sectional view of the demountable rim.

Fig. 7, is a fragmentary side elevation thereof in the region of one of the keyways.

Figure 8:
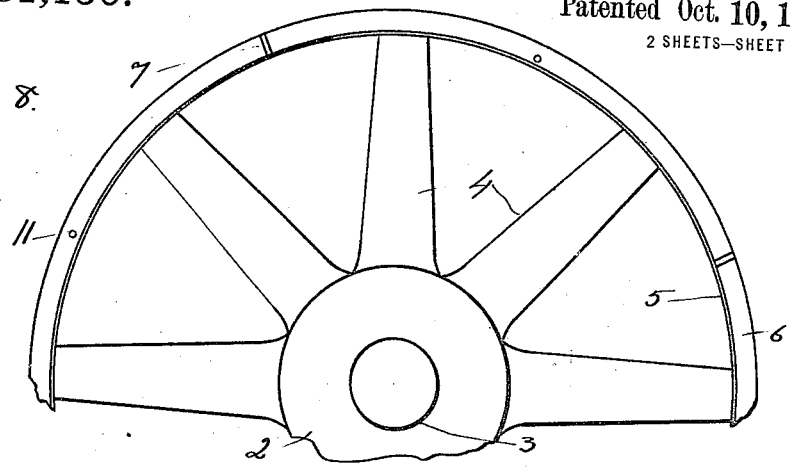
Fig. 8, is a fragmentary side elevation of a wheel with the demountable rim removed.
Figure 9:
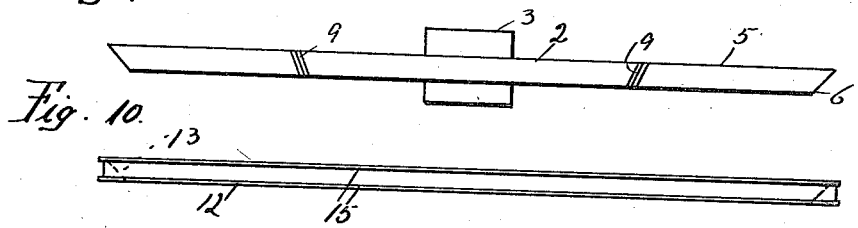
Fig. 9, is an edge view thereof.
Figure 10:
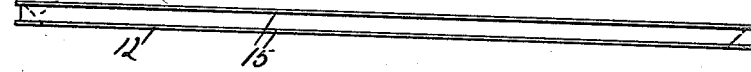
Fig. 10, is an edge view of the demountable rim.
Figure 11:
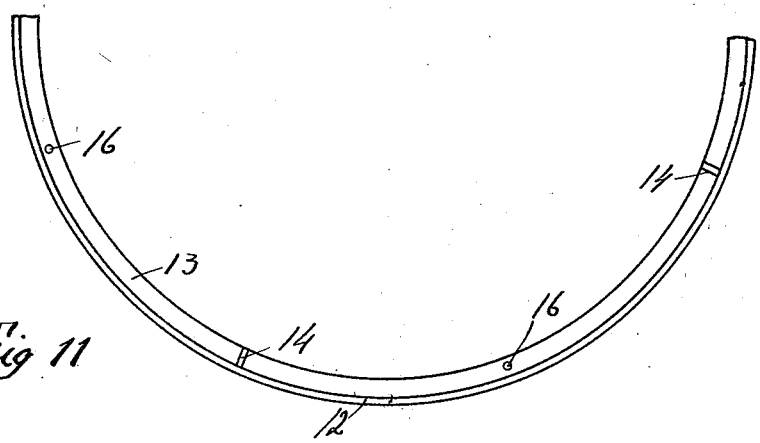
Fig. 11, is a fragmentary elevation thereof.

In carrying out my invention as here embodied, 2 represents a wheel comprising a hub 3, spokes 4 and a wheel felly 5.

The wheel felly 5 is provided with a beveled peripheral face 6 the greatest diameter of said felly being at the back. On the felly is mounted a metallic felly band 7 covering the beveled face and is further provided with an inturned flange 8 to engage the inner face of the felly while on the outer face of the beveled or body portion of the felly band are arranged a number of transverse keys 9 projecting from said felly band and preferably formed integral therewith. Through the felly 5 the felly band 7 and its flange are formed the bolt receiving openings 10, any desired number of which may be provided, through these holes passing the bolts 11.

The demountable rim 12 is in the form of a ring preferably constructed from metal and is provided with an inner beveled face 13 adapted to coincide with the beveled felly band 7 and in the demountable rim are formed a number of keyways 14 for registration with the keys 9 on the wheel felly.

The demountable rim is constructed in any suitable manner for receiving a tire and for convenience of illustration said demountable rim is here shown as having a flange 15 at each side thereof forming a channel therebetween for the reception of a solid tire.

The demountable rim is also provided with a plurality of bolt receiving holes so that when said demountable rim is placed upon the wheel the bolts 11 will pass through the holes 16 after which the nuts 17 may be screwed on the bolts so as to firmly hold the demountable rim in place.

From the foregoing it will be seen that when a wheel is fitted with my invention the demountable rim may be readily and quickly removed carrying its tire and another one easily replaced as in the case of an injury to the former tire or it may be removed and the tire repaired and replaced without the necessity of removing the entire wheel which is the case with a solid tire and the wheels of the ordinary construction.

Of course I do not wish to be limited to the exact details of construction as herein shown as these may be varied within the limits of the appended claim without departing from the spirit of my invention.

Having thus fully described my invention, what I claim as new and useful is:—

In a demountable rim, the combination of a beveled wheel felly, a beveled or flared felly band thereon, integral transverse keys projecting from the outer face of said felly band and inclined co-relative therewith, an internally beveled demountable rim having keyways therein inclined co-relative with the beveled portion thereof and adapted to register with said keys and fastening means for detachably securing said parts together.

In testimony wherof, I have hereunto affixed my signature.

ERNEST BUNZEL.